United States Patent
Correa et al.

(10) Patent No.: US 11,403,845 B2
(45) Date of Patent: Aug. 2, 2022

(54) DYNAMIC DETECTION OF BUILDING STRUCTURE

(71) Applicant: KYNDRYL, INC., New York, NY (US)

(72) Inventors: Andre Luis Correa, Campinas (BR); Ariane Hernandes Amadeu, Nova Odessa (BR); Filipe Veiga Gazzoli, Campinas (BR); Daniel Neves Zanon, Vinhedo (BR); Tiago Dias Generoso, Pocos de Caldas (BR)

(73) Assignee: Kyndryl, Inc., New York, NY (US)

(*) Notice: Subject to any disclaimer, the term of this patent is extended or adjusted under 35 U.S.C. 154(b) by 315 days.

(21) Appl. No.: 16/747,641

(22) Filed: Jan. 21, 2020

(65) Prior Publication Data
US 2021/0224536 A1    Jul. 22, 2021

(51) Int. Cl.
*G06K 9/00* (2022.01)
*G06T 7/00* (2017.01)
*G06V 20/10* (2022.01)
*G06Q 40/08* (2012.01)

(52) U.S. Cl.
CPC ........... *G06V 20/176* (2022.01); *G06Q 40/08* (2013.01); *G06T 7/0002* (2013.01); *G06T 2207/10032* (2013.01); *G06T 2207/30184* (2013.01)

(58) Field of Classification Search
None
See application file for complete search history.

(56) References Cited

U.S. PATENT DOCUMENTS

| | | | |
|---|---|---|---|
| 6,647,161 B1 | 11/2003 | Hodge | |
| 7,711,584 B2 | 5/2010 | Helitzer | |
| 9,036,861 B2 | 5/2015 | Chen | |
| 9,794,755 B1 | 10/2017 | South et al. | |
| 10,977,493 B2* | 4/2021 | Speasl | ................. H04L 9/0825 |
| 2012/0262708 A1 | 10/2012 | Connolly | |
| 2014/0316614 A1 | 10/2014 | Newman | |
| 2017/0092109 A1 | 3/2017 | Trundle | |
| 2017/0146970 A1* | 5/2017 | Joo | ...................... G05B 19/042 |
| 2018/0130196 A1* | 5/2018 | Loveland | ........... H04N 1/00204 |

(Continued)

FOREIGN PATENT DOCUMENTS

| | | |
|---|---|---|
| CN | 102708584 B | 6/2014 |
| CN | 103729853 B | 6/2016 |
| KR | 101796258 B1 | 11/2017 |

OTHER PUBLICATIONS

"Collapse of Buildings in Rio Kills 2 in Militia-Run Area", The Americas, Apr. 12, 2019, 2 pages, <https://www.voanews.com/americas/collapse-buildings-rio-kills-2-militia-run-area>.

(Continued)

*Primary Examiner* — Soo Jin Park
(74) *Attorney, Agent, or Firm* — Erik Swanson; Matthew M. Hulihan; Heslin Rothenberg Farley & Mesiti PC (57) ABSTRACT

Embodiments of the present invention provide a computer system, a computer program product, and a method that comprises determining potential risks associated with a building by analyzing images of the building; generating an interactive diagram that includes a visual representation of structures associated with the building that depicts the determined potential risks associated with the building; and creating a geo-fence surrounding the building upon the program determining potential risks.

20 Claims, 3 Drawing Sheets

(56) References Cited

U.S. PATENT DOCUMENTS

2020/0349695 A1* 11/2020 Horita ............... H04N 5/23212
2021/0216770 A1* 7/2021 Kang ..................... H04W 4/38

OTHER PUBLICATIONS

"Two hurt as wall collapses inside Birmingham building", BBC News, May 8, 2019, 14 pages, <https://www.bbc.com/news/uk-england-birmingham-48208748>.

Kim et al., "Automated Vision-Based Detection of Cracks on Concrete Surfaces Using a Deep Learning Technique", Sensors, Published online Oct. 14, 2018. doi: 10.3390/s18103452, Copyright © 2018 by the authors, 26 pages, <https://www.ncbi.nlm.nih.gov/pmc/articles/PMC6210028/>.

Flindt, Mathias, "Tethered Drone Can Detect Crack in Walls and Concrete", Search in Technological Institute, Printed Jul. 2, 2019, 5 pages, <https://www.dti.dk/specialists/tethered-drone-can-detect-crack-in-walls-and-concrete/39267>.

Lee, Kyreon, "Partially-collapsed building downtown future remains at hands of the court", Thursday, May 9, 2019, 2 pages, <https://krcgtv.com/news/local/partially-collapsed-building-downtown-future-remains-at-hands-of-the-court>.

Patel, Ritesh, "Various Reasons of Buildings Collapse you need to Know!", Courtesy—99acres, Copyright 2019 GharPedia, 6 pages, <https://gharpedia.com/blog/various-reasons-of-buildings-collapse/>.

Verma, Urvashi, "Drones cutting property inspection and maintenance costs for building owners", Aug. 31, 2018, 9 pages, <https://inbuildingtech.com/aerial-drones/drones-office-building-inspections/>.

* cited by examiner

DYNAMIC DETECTION OF BUILDING STRUCTURE

FIELD OF INVENTION

The present invention relates generally to the field of three-dimensional architecture detection and more specifically dynamic predication and analysis of three-dimensional architecture.

BACKGROUND

Building construction is a required task that comes with a plethora of risks that may lead to complete building collapse or violations of multiple building regulations. These risks are often found as defects in design or drawings, use of inferior materials, faulty execution and inadequate supervision, repairing or renovation of defective structures, early aging of materials, lack of maintenance, foundation failures, excavation near adjoining property, excessive forces due to natural disasters, overloading, and change in structural configuration.

Cognitive systems are technology platforms that are based on the scientific disciplines of artificial intelligence and signal processing. These platforms encompass machine learning, reasoning, natural language processing, speech recognition, vision recognition, and human-computer interaction. In general, cognitive systems refer to hardware or software that mimics the functioning of the human brain and helps to improve human decision-making abilities.

Cognitive systems generally refer to hardware and software that mimics the functioning of the human brain and helps improve human-decision making, while expressing different functions, such as adaptative, interactive and contextual. Adaptive functions learn as information changes and feed on dynamic data in real time. Interactive features interact easily with users and other processors, devices, and cloud services. Contextual features of cognitive systems enable the system to understand.

SUMMARY

Embodiments of the present invention provide a computer system, a computer program product, and a method that comprises determining potential risks associated with a building by analyzing images of the building; generating an interactive diagram that includes a visual representation of structures associated with the building that depicts the determined potential risks associated with the building; and creating a geo-fence surrounding the building upon the program determining potential risks.

DETAILED DESCRIPTION

Embodiments of the present invention recognize the need for ways to provide more efficient building inspections using dynamic, cognitive systems in an environment comprised of computing devices. Embodiments of the present invention provides systems, methods, and computer program products for an improvement to existing dynamic, cognitive systems used to determine building structures. Currently, common building inspections require a professional to physically enter and walk through the building structure, which may create unnecessary risks. Also, in building construction, an expert or professional in the field of building construction must physically walk through before completion to determine if the structure meets the required building codes of the region. Furthermore, in the case of a building that is in violation of the region's building codes or in danger of collapse, currently the only form of notification to the general public is in the form of physical signs. Embodiments of the present invention create a system, method, and computer program that would allow the professionals to inspect buildings without having to physically be inside the structure by using multiple cameras around the perimeter of the structure, drones for recent construction, and an analysis of business codes. Thus, embodiments of the present invention to improve building structure detection. Specifically, embodiments of the present invention can determine building structures within a building and determine a safety level associated with the structure (e.g., fault, in violation of building regulations, etc.). Embodiments of the present invention further provide additional capabilities to mark or otherwise notify a user the faulty or unsafe structure (e.g., a geo-fence that surrounds the building and notifies computing devices entering the geo-fence).

Figure 1:
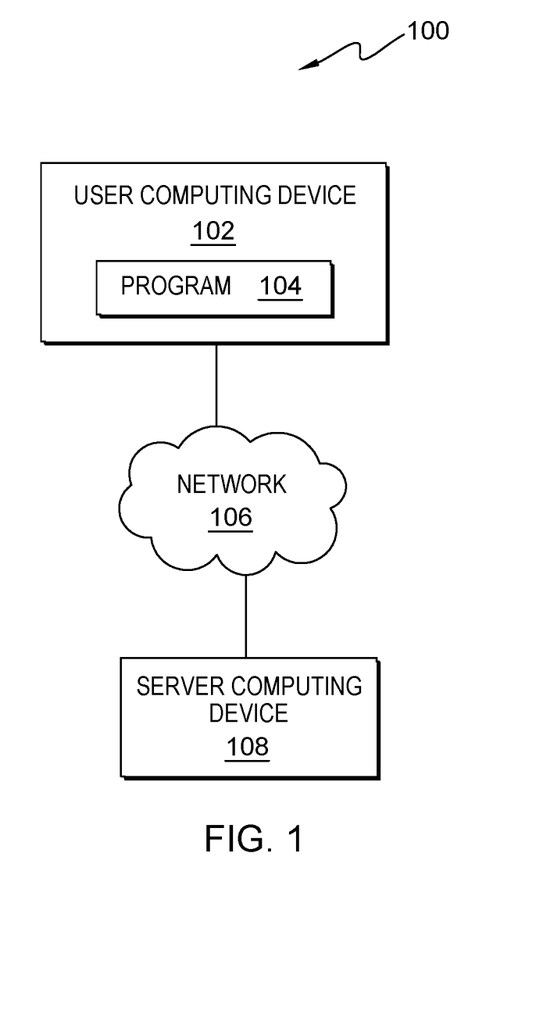
FIG. 1 is a functional block diagram depicting an environment with a computing device connected to or in communication with another computing device in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device may be desktop computers, laptop computers, specialized computer servers, smart phones, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program on the computing device 102. In another embodiment, the program 104 may be stored on a server computing device 108. In this embodiment, the program 104 can dynamically detect building structures, determine safety risks associated with the structure, and generate a visualization around the structure deemed unsafe. A building structure may be defined as an entire building, a partial building, a commercial building, and a residential building. An unsafe condition is defined as a potential major risk of collapse or a potential major violation of the building code. In this embodiment, the program 104 accesses public databases (not shown in FIG. 1). These public databases may be any public information containing satellite images, blueprints, and public cameras. In other embodiments, the program 104 may receive consent to access private information (e.g., social media accounts, etc.) for the purposes of determining building structure safety. For example, the program 104 searches satellite images and social media accounts for images of a specific building, analyzes the images for possible building code violations, and analyzes the images for risks that may lead to collapse; and upon finding potential risks and code violations, dispatching drones to collect more images and details on the inside and outside of the specific building. In another embodiment, the program 104 can access databases containing schematics, blueprints, town hall records, social media with the consent and permission of users, and/or regulatory compliance entities having authority and control over those records. In this embodiment, the permissions to access social media accounts and regulatory compliance entities are obtained via an opt-in/opt-out mechanism. In other embodiments of the present invention, the program 104 can transmit a notification to a computing device 102 when such records are accessed and/or otherwise used.

Once the data is collected and the program 104 determines the risk and violations are major, the program 104 establishes a geo-fence around the specific building to automatically send notifications to computing devices 102 entering the geo-fence to alert the computing devices 102 of the risks and violations. In this embodiment, the program 104 determines the risk by comparing the building and its potential risks to a perfect model of the same building. Also, a major risk is defined as a cause of collapse if left untreated or a serious building code violation compared to the perfect model of the building. A major risk may be defined as exceeding the predetermined threshold by a double-digit percentage, and the predetermined threshold is determined from the comparison of the perfect model. Examples of major risks are deviations from a building structure standards such as structural damage, foundation damage, and extraordinary loads. Extraordinary loads are defined as any amount of weight that exceeds the regulated maximum required to maintain structural integrity. If a risk is not defined as major, the program 104 may define a risk as minor or medium as well. A medium risk is defined as a determined risks that is equal to the predetermined threshold or exceeds the predetermined threshold within a single digit percentage compared to the perfect model. A minor risk is defined as a risk that is less than predetermined threshold but remains within a single digit percentage.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 stored locally and may communicate with the computing device 102 via the network 106. The server computing device 108 may be a single computing device, a laptop, a collection of computing devices, a collection of server devices, and other known computing devices.

Figure 2:
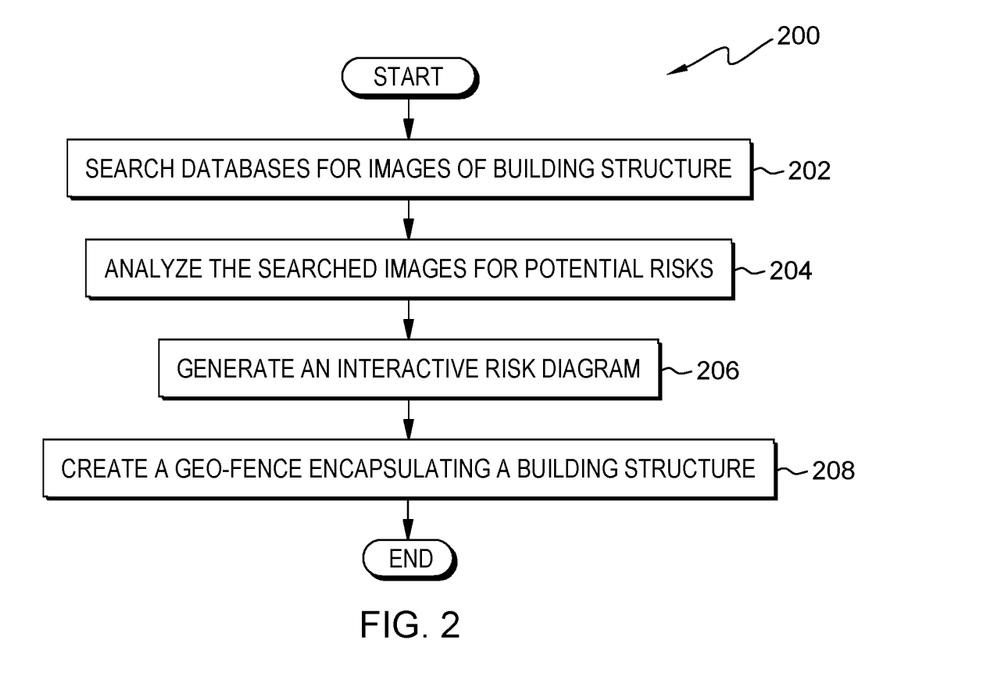
FIG. 2 is a flowchart illustrating operational steps for running a dynamic building structure analysis program, in accordance with at least one embodiment of the present invention.

FIG. 2 is a flowchart 200 illustrating operational steps for dynamic risks of building collapse and violations of building code for specific buildings.

At step 202, a program 104 searches satellite images, social media images, and town hall databases for images of buildings. In this embodiment, the program 104 completes a thorough search on satellite images for images of the exterior of buildings. In this embodiment, the program 104 may use social media images to search for images of the interior of a specific building. In another embodiment, the program 104 may use comments attached to social media images in order to further analyze the interior of a specific building. In this embodiment, the program 104 may use town hall databases to search for blueprint images of a specific building. In this embodiment, the program 104 uses satellite images, social media images, and town hall databases to construct a three-dimensional ("3-D") model of a specific building.

At step 204, a program 104 analyzes the searched images for potential risks and violations. In this embodiment, the program 104 searches satellite images, social media images and comments, and town hall databases for a specific building, while simultaneously determining if the specific building violates any building codes or exhibits any risk of collapse. In this embodiment, the program 104 determines the risks by quantifying each risk as a major, medium, and minor risk depending on the severity of each risk. The program 104 accomplishes this determination by identifying the structures within the building, comparing a perfect example of that structure to the structure under review, and assign a scored based on measured deviations from the standard. For example, the program 104 identifies a flight of stairs in a structure, compares a perfect example to stairs to the identified stairs, and assigns a major risk to the identified stairs because the foundation of the identified stairs is determined to be crumbling due to faulty construction. In another embodiment, the program 104 may transmit instructions to drones to further investigate the building structure if the program 104 is unable to determine the level of potential risks from analyzing the images alone. In another embodiment, the program 104 calculates a path for drones to further investigate the buildings structure when the program 104 fails to classify and determine the potential risks associated with the building structure subject to the determination. In this case, the program 104 determines the potential risks associated with the building structure by further analyzing the information transmitted from the drones.

At step 206, a program 104 generates an interactive risk diagram. In this embodiment, the program 104 generates an interactive diagram that is color coded and separated over three columns to quantify violations and risks, thereby differentiating the levels of potential risks. In this embodiment, the program 104 codes major risks in the color red, codes medium risks in the color yellow, and codes minor risks in the color green. In this embodiment, the program 104 separates the columns into probability, impact, and priority. In this embodiment, the program 104 quantifies major risks as a number 1, medium risks as a number 2, and minor risks as a number 3. The program 104 has a range of 1-3 for severity of risks. The program has three color options, which are red, yellow, and green. For example, the program 104 identifies multiple minor risks and multiple medium risks in one building structure; quantifies that the number of risks; and generates a diagram that has each location of the risk, the associated color of the risk, and the number associated with the risk. In another embodiment, the program 104 may identify numerous minor and medium risks and equate those risks to a major risk due to the numerosity and commonality of the risks. Thus, for common risks in a building structure, the program 104 may aggregate the risks and convert multiple minor risks into one major risk, which would also change the associated numerical value and color in the generated diagram.

At step 208, the program 104 creates a geo-fence encapsulating a building structure determined to have major risks. In this embodiment, the program 104 establishes a geo-fence, using the network 106, encapsulating the building structure in response to the program 104 determining that the building has a major. In this embodiment, after the program 104 establishes the geo-fence, the program 104 automatically notifies any computing device entering the geo-fenced area of the building's classification to provide a level of safety surrounding the building until the building is determined to no longer be a major risk by a professional. In this embodiment, the geo-fence may encapsulate the entire building in response to the program 104 determining that amount of risks or the severity of the major risks compromises the entire building. In another embodiment, the program 104 may notify the proper authorities immediately upon a computing device 102 entering an established geo-fence that is determined to be a major risk.

Figure 3:
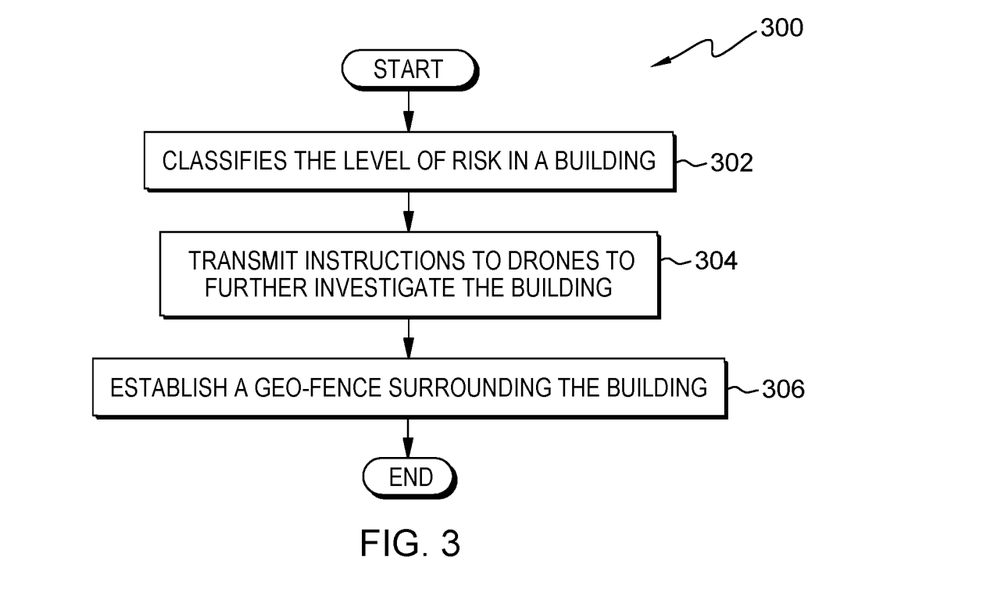
FIG. 3 is a flowchart illustrating operational steps for generating a violation or risk diagram and creating a geo-fence surrounding a specific building.

FIG. 3 is a flowchart 300 illustrating further detailing the operation steps of generating a risk diagram and creating a geo-fence surrounding a building.

At step 302, the program 104 classifies the level of risk in a building. In this embodiment, the program 104 searches and analyzes images through public databases for images and blueprints of a building structure. In another embodiment, the program 104 may receive permission to access private databases for images of a building structure. In this embodiment, the program 104 may determine that the building structure is a major risk. The program 104 identifies a structure within the building, compares the structure under review to a perfect example of the structure, and assigns a quantified numerical value (e.g., score) based on measured deviations from the perfect example of the structure. In this embodiment, the program 104 quantifies major risks as a number 1, medium risks as a number 2, and minor risks as a number 3. The program 104 has a range of 1-3 for severity of risks. The program has three color options, which are red, yellow, and green.

At step 304, the program 104 transmits instructions to drones to further investigate the building. In this embodiment, the program 104 transmits instructions to drones to further investigate the building structure if the program 104 needs more information to finalize a classification of the building. In this embodiment, the program 104 transits instructions to drones to take images on the exterior of the building, and the program 104 transmits instructions to drones to enter the building to take images on the interior of the building. In another embodiment, the program 104 calculates a path to further investigate the building. In another embodiment, the program 104 transmits instructions to drones to take more images of a target areas of the building. The target areas are defined as the areas that the program 104 considered to be areas where risks of collapse exist and areas that are subject to building code violations. In this embodiment, the program 104 allows professionals and experts to examine the extent of the potential risks without being subject to the building's risks.

At step 306, the program 104 establishes a geo-fence surrounding the building. In this embodiment, the program 104 establishes a geo-fence surrounding the building using the network 106. In this embodiment, the program 104 establishes a geo-fence around a building once it determines the classification of risks as major. In this embodiment, the program 104 notifies a computing device 102 upon entering the established geo-fence of the classification of the building as a major risk. In another embodiment, the program 104 establishes the geo-fence using a server computing device 108, which may be one device or a collection of devices. In this embodiment, the program 104 establishes the geo-fence until a professional or expert has made the necessary changes or has determined that the potential risk is no longer major. In another embodiment, the program 104 may notify the proper authorities immediately upon a computing device 102 entering the established geo-fence.

Figure 4:
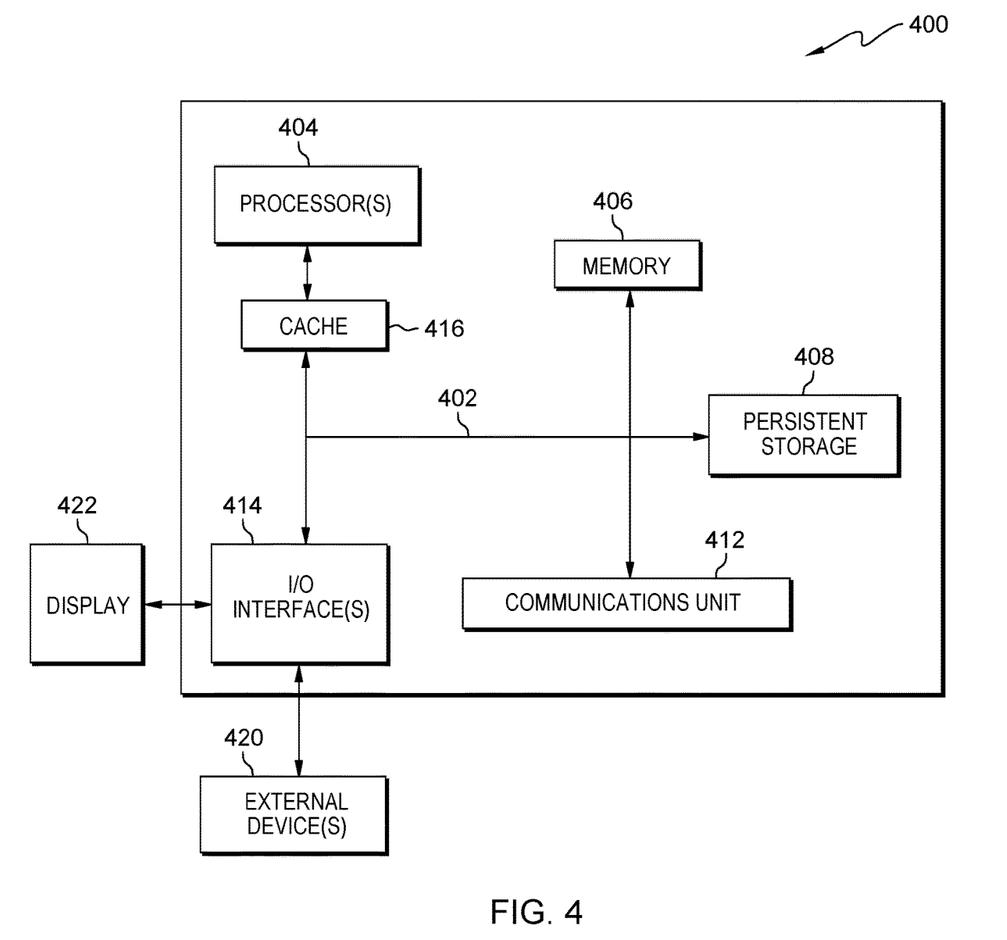
FIG. 4 is a block diagram of internal and external components of the computer device of FIG. 1, in accordance with an embodiment of the present invention.

FIG. 4 depicts a block diagram of components of computing systems within the computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 410, and an input/output (I/O) interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 includes one or more network interface cards. The communications unit 410 may provide communications through the use of either or both physical and wireless communications links. The program 104 may be downloaded to the persistent storage 408 through the communications unit 410.

The I/O interface(s) 412 allows for input and output of data with other devices that may be connected to a mobile device, an approval device, and/or the server computing device 108. For example, the I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 412. The I/O interface(s) 412 also connect to a display 420.

The display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    determining potential risks associated with a building structure by analyzing images of the building structure, wherein the analyzing comprises modeling the building structure using social media images and blueprints of the building structure;
    generating an interactive diagram that includes a visual representation of structures associated with the building that depicts the determined potential risks associated with the building structures; and
    creating a geo-fence encapsulating the building structure in response to reaching or exceeding a threshold value of potential risks for the associated building structure.

2. The computer-implemented method of claim 1, further comprising searching databases for building structure standards, wherein building structure standards comprise at least one selected from the group consisting of: tolerance levels for materials and inspection guidelines.

3. The computer-implemented method of claim 1, further comprising searching the social media images and comments of the social media images for information about an interior of the building structure.

4. The computer-implemented method of claim 1, wherein determining potential risks associated with a building by analyzing images of the building comprises searching for structural damage and foundation damage.

5. The computer-implemented method of claim 1, wherein generating an interactive diagram comprises displaying differentiating levels of potential risks using different colors and different numerical values.

6. The computer-implemented method of claim 1, further comprising notifying authorities in response to a computing device entering the geo-fence.

7. The computer-implemented method of claim 1, further comprising transmitting instructions to drones to calculate a path to further examine an exterior and an interior of the building.

8. The computer-implemented method of claim 1, further comprising
    transmitting instructions to drones to further examine the building structure and determine potential risks for the building structure based on the information transmitted by the drones.

9. A computer program product comprising:
    one or more computer readable storage media and program instructions stored on the one or more computer readable storage media, the program instructions comprising:
        program instructions to determine potential risks associated with a building structure by analyzing images of the building structure, wherein the analyzing comprises modeling the building structure using social media images and blueprints of the building structure;
        program instructions to generate an interactive diagram that includes a visual representation of structures associated with the building that depicts the determined potential risks associated with the building structure; and
        program instructions to create a geo-fence encapsulating the building structure in response to reaching or exceeding a threshold value of potential risks for the associated building structure.

10. The computer program product of claim 9, wherein the program instructions stored on the one or more computer readable storage media further comprise:
    program instructions to search databases for building structure standards, wherein building structure standards comprise at least one selected from the group consisting of: tolerance levels for materials and inspection guidelines.

11. The computer program product of claim 9, wherein the program instructions stored on the one or more computer readable storage media further comprise:
    program instructions to search the social media images and comments of the social media images for information about an interior of the building structure.

12. The computer program product of claim 9, wherein the program instructions to determine potential risks associated with a building structure by analyzing images of the building structure comprise program instructions to search for structural damage and foundation damage.

13. The computer program product of claim 9, wherein the program instructions to generate an interactive diagram comprise program instructions to display differentiating levels of potential risks using different colors and different numerical values.

14. The computer program product of claim 9, wherein the program instructions stored on the one or more computer readable storage media further comprise:
    program instructions to notify authorities in response to a computing device entering the geo-fence.

15. The computer program product of claim 9, wherein the program instructions stored on the one or more computer readable storage media further comprise:
    program instructions to transmit instructions to drones to calculate a path to further examine an exterior and an interior of the building.

16. A computer system comprising:
one or more computer processors;
one or more computer readable storage media; and
program instructions stored on the one or more computer readable storage media for execution by at least one of the one or more processors, the program instructions comprising:
  program instructions to determine potential risks associated with a building structure by analyzing images of the building structure, wherein the analyzing comprises modeling the building structure using social media images and blueprints of the building structure;
  program instructions to generate an interactive diagram that includes a visual representation of structures associated with the building that depicts the determined potential risks associated with the building structure; and
  program instructions to create a geo-fence encapsulating the building structure in response to reaching or exceeding a threshold value of potential risks for the associated building structure.

17. The computer system of claim 16, wherein the program instructions stored on the one or more computer readable storage media further comprise:
  program instructions to search databases for building structure standards, wherein building structure standards comprise at least one selected from the group consisting of: tolerance levels for materials and inspection guidelines.

18. The computer system of claim 16, wherein the program instructions to generate an interactive diagram comprise program instructions to display differentiating levels of potential risks using different colors and different numerical values.

19. The computer system of claim 16, wherein the program instructions stored on the one or more computer readable storage media further comprise:
  program instructions to notify authorities in response to a computing device entering the geo-fence.

20. The computer system of claim 16, wherein the program instructions stored on the one or more computer readable storage media further comprise:
  program instructions to transmit instructions to drones to calculate path to further examine an exterior and an interior of the building.

* * * * *